Jan. 7, 1969  R. E. DOERFER ETAL  3,420,148

HOLDING DEVICE

Filed March 12, 1965  Sheet 1 of 2

INVENTORS
RICHARD E. DOERFER
MARION E. HUTCHISON

BY *MacMoody*

ATTORNEY

United States Patent Office 3,420,148
Patented Jan. 7, 1969

3,420,148
HOLDING DEVICE
Richard E. Doerfer, Four Seasons Drive 50701, and Marion E. Hutchison, P.O. Box 2332 50705, both of Waterloo, Iowa
Filed Mar. 12, 1965, Ser. No. 439,152
U.S. Cl. 92—107       1 Claim
Int. Cl. F01b *31/06;* F15b *13/06;* F01b *31/12*

ABSTRACT OF THE DISCLOSURE

This invention relates in general to holding means and, in particular, to a novel hydraulically actuated holding and chucking device.

---

It is oftentimes necessary and desirable to hold irregularly-shaped members so that they may be machined. This presents a problem in that most holding chucks are designed for symmetrical parts. Thus, blocks and other expedients have been used to lock the work piece to a jig or fixture.

It is an object of the present invention to provide a novel holding means which easily and accurately holds a work piece.

Another object is to provide an improved hydraulic holding system which exerts uniform pressure on an irregular work piece.

Yet another object is to provide a holding cylinder of novel design.

Another object is to provide an improved holding device which can be controlled to apply pressure over a wide selectable range to a work piece.

A feature of this invention is found in the provision for a hydraulic pressure source of adjustable pressure which is attached to a plurality of hydraulic cylinders to actuate them to clamp a work piece. The cylinders may be adjusted to fit various sizes and shapes of work pieces and to provide uniform pressure.

Each cylinder has a movable piston capable of exerting equal pressure on the work piece regardless of the location or number of cylinders used.

The pressure points of this invention hold the work piece in a free-state condition and thereby virtually eliminate initial clamping distortion.

During the machining operation the internal stresses in the work piece are relieved and the pressure points automatically adjust allowing the production of a true machined surface.

Since the pressure points are adjustable they are well suited to secure irregular parts and also to compensate for variations in particular parts from one piece to another.

The compact design of the pressure points of this invention allow their operation in remote areas that are not accessible with conventional clamping systems.

The pressure points can be remotely controlled in a simple manner in that tubing connecting each pressure point to the hydraulic reservoir is easy to install.

A gauge is connected in the pressure system to allow controlled pressure to be applied by the points.

The points are threadedly mounted in their holders to allow individual movements of each point. Any desired number of points can be used with the same hydraulic system.

The pressure applied by the points can be selectively varied from ounces to tons per point.

The stroke of the pressure point is automatically controlled by the position of the part and the applied pressure and all of the points are actuated simultaneously regardless of the number used.

Further objects, features and advantages will become apparent from the following description and claim when read in view of the drawings, in which:

FIGURE 1 illustrates the holding system of this invention mounted so as to hold an irregular work piece 93.

Figure 1:
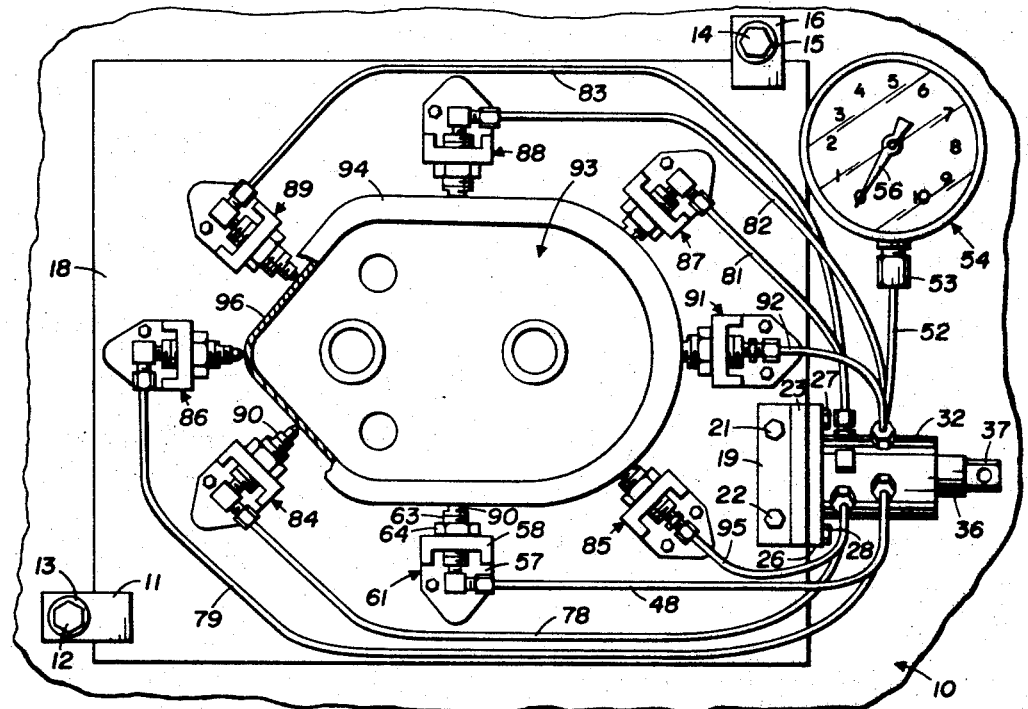
FIGURE 1 is a top plan view of the holding system of this invention.

The machine has a base plate 10 to which the work piece 93 is to be attached. The base plate 10 might be rotatable or stationary. A holding lug 11 is attachable to plate 10 by bolt 12 and washer 13 and may be tightened to lock plate 18 to base plate 10. A second holding lug 16 is attachable to plate 10 to lock plate 18 to the base plate. Suitable threaded openings are formed in plate 10 to receive bolts 12 and 14.

Figure 3:
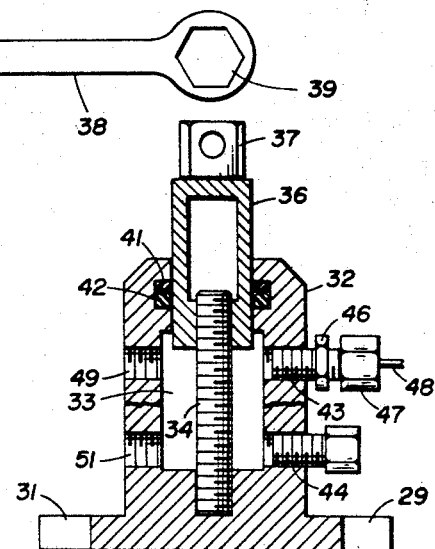
FIGURE 3 is a sectional view of the hydraulic cylinder.

An L-shaped bracket 19 is attached to plate 18 by bolts 21 and 22 and has an upwardly extending arm 23. A hydraulic cylinder 32 has a base plate 26 which is attached to arm 23 by bolts 27 and 28. As best shown in FIGURE 3, base 26 is formed with slots 29 and 31 through which bolts 27 and 28 may extend.

Cylinder 33 is formed with a hollow chamber 33 in which hydraulic fluid is contained. A filler plug mounted in the cylinder allows the fluid to be poured into the cylinder.

A threaded shaft 34 is attached to base 26 and extends into cavity 33. A piston 36 is threaded and receives shaft 34. Piston 36 has a nut 37 attached to its end which is outside of the cylinder. A wrench 38 has an engaging portion 39 which fits over nut 37 to turn the piston and move it into or out of the cylinder.

A slot is formed in the cylinder and an O-ring 42 and a back-up washer 41 are mounted in the slot to seal the piston and cylinder.

A plurality of threaded ports 43, 44, 49 and 51 are formed through the wall of cylinder 32 and receive threaded tubes 46 therethrough. Conduit 48 is connected to a coupling 47 which is threaded to tube 46 to make a fluid seal connection.

A tube 46 and conduit may be attached to each port of the cylinder. Any unused ports may be sealed with a threaded plug.

FIGURE 1 shows a plurality of conduits 48, 78, 79, 52, 81, 82, 83, 92, 95 and 52 attached to cylinder 32. It is to be realized that each conduit is attached to a port in the cylinder. As many ports may be formed in the cylinder as desired.

A pressure point 61 is connected to the end of the conduits. In FIGURE 1 pressure points 61, 89, 91, 87, 88, 89, 86 and 84 are shown connected respectively to conduits 48, 95, 92, 81, 82, 83 and 79.

Figure 2:
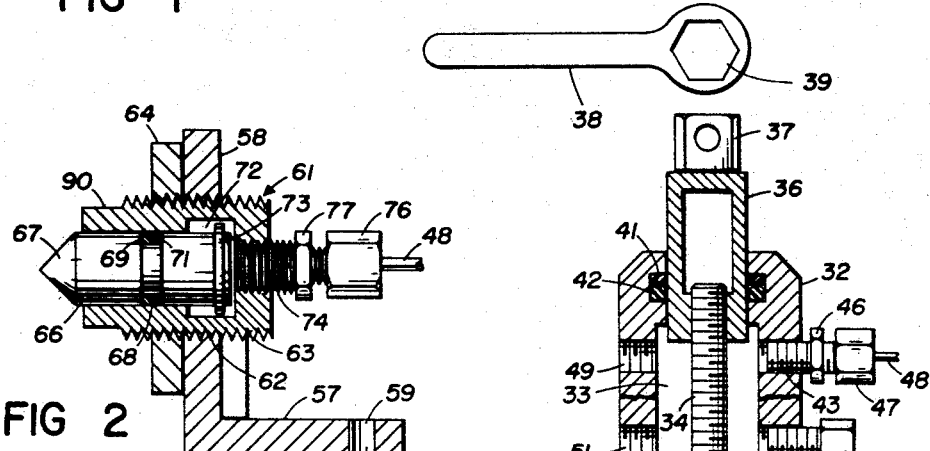
FIGURE 2 is a detailed sectional view of one of the pressure points.

As best shown in FIGURE 2 each pressure point has a bracket 57 with an up-right member 58. Openings 59 are formed in the bracket 57 and set screws allow the brackets to be attached to plate 18 which has suitable mounting holes for that purpose.

Each pressure point is formed with an externally threaded cylinder 63 which is threadedly connected to an opening 62 in the upright member 58. One end 90 is formed with flats so that the cylinder can be adjusted relative to the member 58. A lock nut 64 is received over cylinder 63 and locks it at a desired position relative to the upright 58.

The cylinder 63 is formed with a central opening into which is received a piston 66.

An enlarged portion 72 is formed in the central opening of the cylinder and a snap-ring 73 which is carried in a groove on the piston locks the piston into the cylinder. The groove in the piston is large enough to allow the snap-ring to be depressed so as to insert the piston into the cylinder, but once it reaches the enlarged portion 72 it locks the piston to the cylinder. The piston is then limited in motion by the size of the enlarged portion 72.

A threaded port 74 is mounted in the end of each cylinder and a coupling 76 is threaded into each port to connect the conduit to the cylinder.

Each piston 66 is formed with a groove 68 which carries an O-ring 69 and a back-up washer 71 to form a fluid seal between the piston and cylinder wall. Each piston is formed with an engaging point 67.

A conduit 52 is also connected to hydraulic cylinder 32 and is connected by coupling 53 to a pressure gauge 54 which has a needle 56 which moves against suitable indicia.

In operation, the work piece 93 is to be attached to the plate 18 to allow the rim 94 or other portions of the work piece to be machined. The pressure points 61, 84, 86, 89, 88, 87, 91 and 95 are attached to plate 18 as shown in FIGURE 1. Each cylinder can have its cylinder 90 adjusted relative to the upright member 58 and locked in place by lock-nut 64. The work piece 93 is then placed on plate 18 and wrench 38 is placed on nut 37 to place the fluid in chamber 33 under pressure. The nut 37 would be loose prior to placing the work piece in the apparatus.

The pressure can be varied in the chamber 33 by turning the wrench 38 and in a particular embodiment the pressure can be varied from zero to 10,000 pounds per square inch in the chamber as observed on gauge 54.

The hydraulic fluid passes through the conduits and drives the pressure points toward the work piece to lock it to the plate 18. Since the same pressure is exerted on all pistons uniform loading of the work piece will occur.

Figure 4:
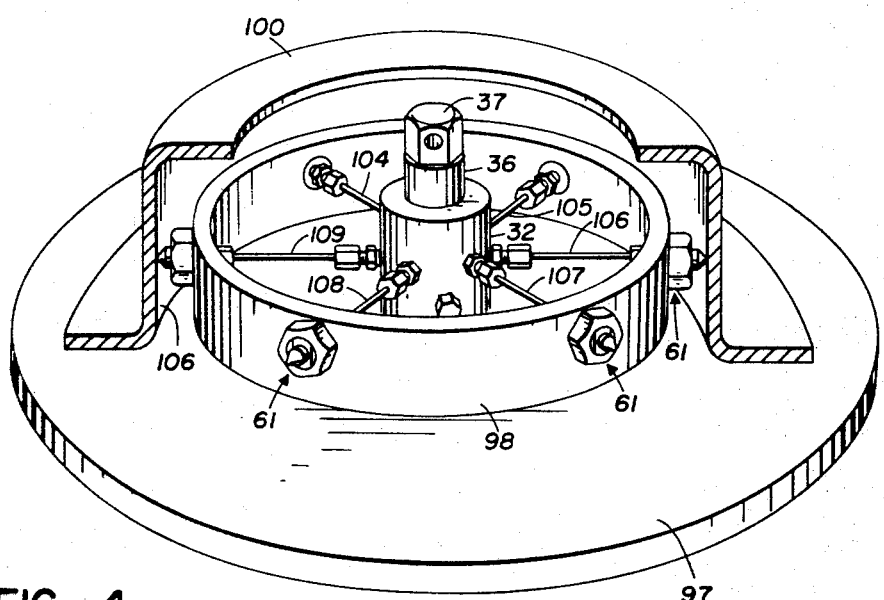
FIGURE 4 is a cut-away perspective view of an application of the invention.

FIGURE 4 illustrates a different work piece which is to be held on its inner rim and locked to a plate 97. The pressure points 61 are mounted about a rim 98 which is welded or otherwise attached to plate 97. The cylinder 32 is attached to plate 97 within the rim 98 and is connected to the pressure points by conduits 104, 105, 106, 107, 108 and 109. The piston 36 is adjusted in the cylinder 32 by turning nut 37.

The work piece 100 fits over the rim 98 and is locked by the pressure points 61 on its internal surface. Thus, the external surface of the work piece 100 can be machined.

Figure 5:
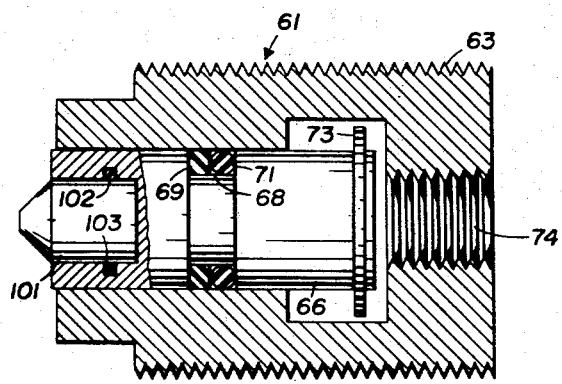
FIGURE 5 is a sectional view of a modification of a pressure point.

FIGURE 5 illustrates a modification in which the point 67 may be interchanged due to wear or a desire for a point of different shape. The piston 66 is formed with an opening and a replaceable point 101 may be inserted therein. A groove 102 formed in the piston holds a ring 103 which firmly holds the point 101. However, the point can be pulled and replaced when desired.

Figure 6:
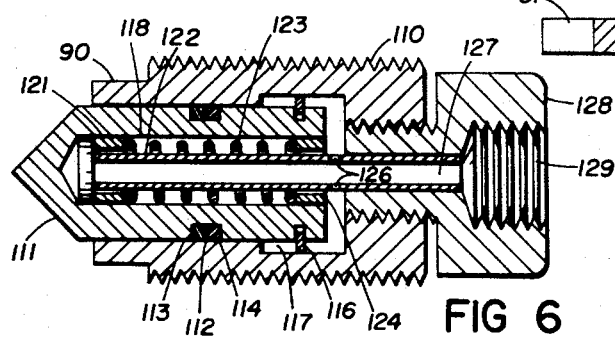
FIGURE 6 illustrates a modification with spring return of the piston.

FIGURE 6 illustrates a modification of the invention wherein the piston has a spring return for allowing very speedy release of the pressure points when the hydraulic pressure is removed. A cylinder 110 has an opening into which a pressure point 111 is received. The opening has an enlarged portion 117 into which ring 116 fits. Ring 116 is carried by a groove in piston 111.

A groove 113 is formed in piston 119 and has an O-ring 114 and a backup washer 112 mounted therein to form a seal between the piston and cylinder.

The piston is formed with a central opening 118 into which a tube 122 extends. A ring 121 is attached to tube 122 and a spring 123 has one end against the ring 121 and the other end against a ring 124 to bias the piston toward the right relative FIGURE 6.

Tube 122 is connected to a member 128 which is threaded into cylinder 110. Member 128 has internal threads 129 to allow a fluid coupling to be attached.

Fluid can pass through portion 127 of tube 122 and through openings 126 formed in tube 122 to actuate the piston when hydraulic pressure is applied. When the pressure is released, the spring 123 expands and moves the piston to the right relative to the cylinder in FIGURE 6. This allows very rapid release of the pressure points which may be desirable in automatic machines, for example.

It is seen that this invention provides a new and novel apparatus for locking members together.

The cylinders 63 of the pressure points are individually adjustable relative to the work piece and the pistons work directly against the work piece. The pressure points contain only one moving part, the pistons 66. The piston is a one-piece design, rather than conventional piston and rod configurations.

The pressure point is a permanent assembly due to snap ring 73.

The cylinders are externally threaded directly into brackets 57 and this eliminates a holding device. Various points, such as flat or round, are available. Also, removable or throw-away tips can be used.

The hydraulic cylinder 32 has multiple radial holes which permit direct connections with each pressure point. The internal threaded piston design results in maximum compactness and simplicity of design and the piston and rod are of one-piece construction.

It is seen that this invention provides a simple and efficient holding means and although it has been described with respect to preferred embodiments it is not to be so limited as changes and modifications may be made which are within the full intended scope as defined by the appended claim.

We claim:

1. A holding point comprising a cylinder formed with an internal opening, a portion of the cylinder formed with an enlarged opening, a piston receivable within the cylinder and having a holding means at its outer end, a groove formed adjacent the other end of the piston, a snap ring receivable within the groove to limit the motion of the piston within the enlarged opening of the cylinder, a tubular opening formed in the piston, a tube attached to the cylinder and extending into the tubular opening of the piston, a transverse opening formed in the tube to allow fluid to pass into the cylinder, a ring attached to the inner end of the tube, a spring surrounding the tube with one end against the ring, a second ring attached to the piston inside the tubular opening and the other end of the spring bearing against it to bias the piston in a first direction relative to the cylinder, and fluid means connected to the tube to move the piston in a second direction.

References Cited

UNITED STATES PATENTS

| | | | |
|---|---|---|---|
| 2,430,100 | 11/1947 | Brumder et al. | 92—107 |
| 2,851,831 | 9/1958 | Healy | 279—4 |
| 2,851,994 | 9/1958 | Fagge | 92—107 |
| 2,948,540 | 8/1960 | Garberding | 92—107 |
| 3,025,071 | 3/1962 | Larrad | 279—4 |
| 3,076,662 | 2/1963 | Kostyrka | 279—4 |
| 3,174,745 | 3/1965 | Schmidt | 92—130 |
| 3,186,308 | 6/1965 | Butterworth | 92—23 |

PAUL E. MASLOUSKY, *Primary Examiner.*

U.S. Cl. X.R.

92—5, 61, 110, 113, 130, 164